US009279951B2

(12) United States Patent
McGranahan et al.

(10) Patent No.: US 9,279,951 B2
(45) Date of Patent: Mar. 8, 2016

(54) FIBER OPTIC MODULE FOR LIMITED SPACE APPLICATIONS HAVING A PARTIALLY SEALED MODULE SUB-ASSEMBLY

(75) Inventors: Daniel Scott McGranahan, Fort Worth, TX (US); Kenneth Charles Simonson, Arlington, TX (US); Jason Cameron Payne, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 861 days.

(21) Appl. No.: 13/282,028

(22) Filed: Oct. 26, 2011

(65) Prior Publication Data

US 2012/0106912 A1 May 3, 2012

Related U.S. Application Data

(60) Provisional application No. 61/407,195, filed on Oct. 27, 2010, provisional application No. 61/426,212, filed on Dec. 22, 2010.

(51) Int. Cl.
*G02B 6/00* (2006.01)
*G02B 6/44* (2006.01)
(Continued)

(52) U.S. Cl.
CPC ............ *G02B 6/4453* (2013.01); *G02B 6/3897* (2013.01); *G02B 6/4452* (2013.01); *G02B 6/444* (2013.01); *G02B 6/4441* (2013.01);
(Continued)

(58) Field of Classification Search
CPC ........ G02B 6/444; G02B 6/4441; G02B 6/46; G02B 6/4452; G02B 6/4453; G02B 6/4471; G02B 6/4477; G02B 6/4478; G02B 6/3897

USPC .................................................. 385/134–139
See application file for complete search history.

(56) References Cited

U.S. PATENT DOCUMENTS

| 620,013 | A | 2/1899 | Barnes |
| 2,528,910 | A | 11/1950 | Poe |
| 2,614,685 | A | 10/1952 | Miller |

(Continued)

FOREIGN PATENT DOCUMENTS

| AU | 2010270959 A1 | 2/2012 |
| CA | 2029592 A1 | 5/1992 |

(Continued)

OTHER PUBLICATIONS

Advisory Action for U.S. Appl. No. 13/539,683 mailed Jan. 30, 2015, 3 pages.

(Continued)

*Primary Examiner* — Ryan Lepisto
*Assistant Examiner* — Guy Anderson

(57) ABSTRACT

A fiber optic module having a module housing and a module sub-assembly. The module housing defines at least an interior space, at least one adapter aperture and at least one input aperture. The module sub-assembly defines at least one fiber optic cable, for example, passing through the at least one input aperture, at least one multi-fiber connector on an end of the fiber optic cable, and at least one single fiber connector on an opposite end of the fiber optic cable, the multi-fiber connector being in optical communication with the at least one single fiber connector, the multi-fiber connector capable of flexing on the at least one fiber optic cable relative to the module housing.

21 Claims, 10 Drawing Sheets

(51) Int. Cl.
*G02B 6/38* (2006.01)
*G02B 6/46* (2006.01)

(52) U.S. Cl.
CPC ............ *G02B6/4471* (2013.01); *G02B 6/4477* (2013.01); *G02B 6/4478* (2013.01); *G02B 6/46* (2013.01)

(56) References Cited

U.S. PATENT DOCUMENTS

| | | |
|---|---|---|
| 3,081,717 A | 3/1963 | Yurevich |
| 3,175,873 A | 3/1965 | Blomquist et al. |
| 3,212,192 A | 10/1965 | Bachmann et al. |
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,606,449 A | 9/1971 | Whybrew et al. |
| 3,646,244 A | 2/1972 | Cole |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,148,454 A | 4/1979 | Carlson et al. |
| 4,239,316 A | 12/1980 | Spaulding |
| 4,244,638 A | 1/1981 | Little et al. |
| 4,285,486 A | 8/1981 | Von Osten et al. |
| 4,303,296 A | 12/1981 | Spaulding |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,561,615 A | 12/1985 | Medlin, Jr. |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,711,518 A | 12/1987 | Shank et al. |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,060,897 A | 10/1991 | Thalenfeld |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,123,071 A | 6/1992 | Mulholland et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,230,492 A | 7/1993 | Zwart et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,291,570 A | 3/1994 | Filgas et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,329,520 A | 7/1994 | Richardson |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |

(56) References Cited

U.S. PATENT DOCUMENTS

| | | |
|---|---|---|
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,421,532 A | 6/1995 | Richter |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,538,213 A | 7/1996 | Brown |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,606 A | 11/1997 | Hassan |
| 5,689,607 A | 11/1997 | Vincent et al. |
| 5,692,079 A | 11/1997 | Iso |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A | 9/2000 | Baker et al. |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |

(56) References Cited

U.S. PATENT DOCUMENTS

| | | |
|---|---|---|
| 6,170,784 B1 | 1/2001 | MacDonald et al. |
| 6,172,782 B1 | 1/2001 | Kobayashi |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,216,987 B1 | 4/2001 | Fukuo |
| 6,220,762 B1 | 4/2001 | Kanai et al. |
| 6,227,717 B1 | 5/2001 | Ott et al. |
| 6,229,948 B1 | 5/2001 | Blee et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,247,851 B1 | 6/2001 | Ichihara |
| 6,259,850 B1 | 7/2001 | Crosby, Jr. et al. |
| 6,263,141 B1 | 7/2001 | Smith |
| 6,265,680 B1 | 7/2001 | Robertson |
| 6,269,212 B1 | 7/2001 | Schiattone |
| 6,273,532 B1 | 8/2001 | Chen et al. |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,289,618 B1 | 9/2001 | Kump et al. |
| 6,292,614 B1 | 9/2001 | Smith et al. |
| 6,301,424 B1 | 10/2001 | Hwang |
| 6,305,848 B1 | 10/2001 | Gregory |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,324,575 B1 | 11/2001 | Jain et al. |
| 6,325,549 B1 | 12/2001 | Shevchuk |
| 6,327,059 B1 | 12/2001 | Bhalla et al. |
| RE37,489 E | 1/2002 | Anton et al. |
| 6,343,313 B1 | 1/2002 | Salesky et al. |
| 6,344,615 B1 | 2/2002 | Nolf et al. |
| 6,347,888 B1 | 2/2002 | Puetz |
| 6,353,696 B1 | 3/2002 | Gordon et al. |
| 6,353,697 B1 | 3/2002 | Daoud |
| 6,357,712 B1 | 3/2002 | Lu |
| 6,359,228 B1 | 3/2002 | Strause et al. |
| 6,360,050 B1 | 3/2002 | Moua et al. |
| 6,363,198 B1 | 3/2002 | Braga et al. |
| 6,363,200 B1 | 3/2002 | Thompson et al. |
| 6,370,309 B1 | 4/2002 | Daoud |
| 6,371,419 B1 | 4/2002 | Ohnuki |
| 6,375,129 B2 | 4/2002 | Koziol |
| 6,377,218 B1 | 4/2002 | Nelson et al. |
| 6,379,052 B1 | 4/2002 | de Jong et al. |
| 6,381,642 B1 | 4/2002 | O'Donnell et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 | 6/2002 | Hines et al. |
| 6,406,314 B1 | 6/2002 | Byrne |
| 6,411,767 B1 | 6/2002 | Burrous et al. |
| 6,412,986 B1 | 7/2002 | Ngo et al. |
| 6,418,262 B1 | 7/2002 | Puetz et al. |
| 6,419,519 B1 | 7/2002 | Young |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,494,550 B1 | 12/2002 | Chen et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,522,804 B1 * | 2/2003 | Mahony ............... G02B 6/4451 385/24 |
| 6,532,332 B2 | 3/2003 | Solheid et al. |
| 6,533,472 B1 | 3/2003 | Dinh et al. |
| 6,535,397 B2 | 3/2003 | Clark et al. |
| 6,539,147 B1 | 3/2003 | Mahony |
| 6,539,160 B2 | 3/2003 | Battey et al. |
| 6,542,688 B1 | 4/2003 | Battey et al. |
| 6,544,075 B1 | 4/2003 | Liao |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,568,542 B1 | 5/2003 | Chen |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,585,423 B1 | 7/2003 | Vergeest |
| 6,587,630 B2 | 7/2003 | Spence et al. |
| 6,588,938 B1 | 7/2003 | Lampert et al. |
| 6,591,051 B2 | 7/2003 | Solheid et al. |
| 6,591,053 B2 | 7/2003 | Fritz |
| 6,592,266 B1 | 7/2003 | Hankins et al. |
| 6,597,670 B1 | 7/2003 | Tweedy et al. |
| 6,600,106 B2 | 7/2003 | Standish et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,612,874 B1 | 9/2003 | Stout et al. |
| 6,614,978 B1 | 9/2003 | Caveney |
| 6,614,980 B1 * | 9/2003 | Mahony ............... G02B 6/4451 385/135 |
| 6,621,975 B2 | 9/2003 | Laporte et al. |
| 6,622,873 B2 | 9/2003 | Hegrenes et al. |
| 6,624,389 B1 | 9/2003 | Cox |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,661,650 B2 | 12/2003 | Nakajima et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,693,552 B1 | 2/2004 | Herzig et al. |
| 6,695,620 B1 | 2/2004 | Huang |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,721,482 B1 | 4/2004 | Glynn |
| 6,731,851 B2 | 5/2004 | Sato et al. |
| 6,741,784 B1 | 5/2004 | Guan |
| 6,741,785 B2 | 5/2004 | Barthel et al. |
| 6,746,037 B1 | 6/2004 | Kaplenski et al. |

(56) References Cited

U.S. PATENT DOCUMENTS

| | | | |
|---|---|---|---|
| 6,748,154 B2 | 6/2004 | O'Leary et al. |
| 6,748,155 B2 | 6/2004 | Kim et al. |
| 6,758,600 B2 * | 7/2004 | Del Grosso | G02B 6/4471 385/59 |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,863,444 B2 | 3/2005 | Anderson et al. |
| 6,863,446 B2 | 3/2005 | Ngo |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,088,893 B2 * | 8/2006 | Cooke | G02B 6/4473 385/100 |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 | 11/2006 | Pulizzi et al. |
| 7,147,383 B2 | 12/2006 | Sullivan |
| 7,170,466 B2 | 1/2007 | Janoschka |
| 7,171,099 B2 | 1/2007 | Barnes et al. |
| 7,171,100 B2 | 1/2007 | Solheid et al. |
| 7,171,121 B1 | 1/2007 | Skarica et al. |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,217,040 B2 | 5/2007 | Crews et al. |
| 7,218,526 B2 | 5/2007 | Mayer |
| 7,220,065 B2 | 5/2007 | Han et al. |
| 7,220,145 B2 | 5/2007 | Denovich et al. |
| 7,221,832 B2 | 5/2007 | Tinucci |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,280,733 B2 | 10/2007 | Larson et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,295,747 B2 | 11/2007 | Solheid et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |

(56) References Cited

U.S. PATENT DOCUMENTS

| | | |
|---|---|---|
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,333,708 B2 * | 2/2008 | Blackwell et al. ............ 385/135 |
| 7,340,145 B2 | 3/2008 | Allen |
| 7,349,615 B2 | 3/2008 | Frazier et al. |
| 7,352,946 B2 | 4/2008 | Heller et al. |
| 7,352,947 B2 | 4/2008 | Phung et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,506,923 B1 | 3/2009 | Gauss |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 * | 5/2009 | Zimmel ............ 385/135 |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,376 B2 * | 11/2009 | Wright et al. ............ 385/135 |
| 7,613,377 B2 | 11/2009 | Gonzales et al. |
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,871,203 B2 | 1/2011 | Iwaya |
| 7,876,580 B2 | 1/2011 | Mayer |
| 7,899,298 B2 * | 3/2011 | Cox et al. ............ 385/135 |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,249 B2 | 6/2011 | Solheid et al. |
| 7,970,250 B2 | 6/2011 | Morris |
| 7,991,252 B2 | 8/2011 | Cheng et al. |
| 8,009,959 B2 | 8/2011 | Barnes et al. |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,081,857 B2 * | 12/2011 | Nair et al. ............ 385/135 |
| 8,093,499 B2 | 1/2012 | Hoffer et al. |
| 8,107,785 B2 | 1/2012 | Berglund et al. |
| 8,131,126 B2 | 3/2012 | Kowalczyk et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,267,472 B2 | 9/2012 | Large et al. |
| 8,270,798 B2 | 9/2012 | Dagley et al. |
| 8,280,216 B2 | 10/2012 | Cooke et al. |
| 8,285,104 B2 | 10/2012 | Davis et al. |
| 8,290,332 B2 | 10/2012 | Mudd |
| 8,301,004 B2 | 10/2012 | Cooke et al. |
| 8,331,752 B2 | 12/2012 | Biribuze |
| 8,353,494 B2 | 1/2013 | Peng et al. |
| 8,369,679 B2 | 2/2013 | Wakileh et al. |
| 8,391,666 B2 | 3/2013 | Hetzer et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 8,873,925 B2 | 10/2014 | Lavoie et al. |

(56) References Cited

U.S. PATENT DOCUMENTS

| | | |
|---|---|---|
| 2001/0001270 A1 | 5/2001 | Williams Vigliaturo |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0028055 A1 | 3/2002 | Shibutani et al. |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |
| 2003/0021539 A1 | 1/2003 | Kwon et al. |
| 2003/0036748 A1 | 2/2003 | Cooper et al. |
| 2003/0051026 A1 | 3/2003 | Carter et al. |
| 2003/0066998 A1 | 4/2003 | Lee |
| 2003/0072551 A1 | 4/2003 | Douglas et al. |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111800 A1* | 5/2005 | Cooke et al. .............. 385/100 |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0178573 A1 | 8/2005 | James |
| 2005/0185910 A1* | 8/2005 | Zimmel .................. 385/135 |
| 2005/0201073 A1 | 9/2005 | Pincu et al. |
| 2005/0232550 A1 | 10/2005 | Nakajima et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1 | 1/2006 | Caveney et al. |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093278 A1* | 5/2006 | Elkins, II ............. G02B 6/4473 385/76 |
| 2006/0093302 A1 | 5/2006 | Solheid et al. |
| 2006/0093303 A1 | 5/2006 | Reagan et al. |
| 2006/0098931 A1* | 5/2006 | Sibley et al. .................. 385/135 |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0058641 A1 | 3/2007 | Cicchetti et al. |
| 2007/0086723 A1 | 4/2007 | Sasaki et al. |
| 2007/0092195 A1 | 4/2007 | Solheid et al. |
| 2007/0104447 A1 | 5/2007 | Allen |
| 2007/0110373 A1 | 5/2007 | Dudek et al. |
| 2007/0110384 A1* | 5/2007 | Cody .................. G02B 6/4475 385/134 |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0069513 A1* | 3/2008 | Desanti .................. 385/137 |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |

(56) References Cited

U.S. PATENT DOCUMENTS

| | | |
|---|---|---|
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0260344 A1* | 10/2008 | Smith et al. ............... 385/135 |
| 2008/0260345 A1* | 10/2008 | Mertesdorf et al. ........ 385/137 |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022467 A1* | 1/2009 | Puetz et al. .............. 385/135 |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1* | 4/2009 | Hill ......................... 385/135 |
| 2009/0110347 A1 | 4/2009 | Jacobsson |
| 2009/0121092 A1 | 5/2009 | Keith |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0148120 A1* | 6/2009 | Reagan et al. ............ 385/135 |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0245744 A1* | 10/2009 | Smith et al. ............... 385/135 |
| 2009/0252472 A1* | 10/2009 | Solheid et al. ............ 385/135 |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran De Leon et al. |
| 2009/0297111 A1 | 12/2009 | Reagan et al. |
| 2009/0297112 A1* | 12/2009 | Mertesdorf et al. ........ 385/135 |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054669 A1* | 3/2010 | DiMarco .................... 385/81 |
| 2010/0054681 A1* | 3/2010 | Biribuze .............. G02B 6/4452 385/135 |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran De Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0092136 A1* | 4/2010 | Nhep ......................... 385/76 |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142888 A1* | 6/2010 | Graff et al. .................. 385/24 |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1* | 7/2010 | Nair et al. ................. 385/135 |
| 2010/0171350 A1 | 7/2010 | Large et al. |
| 2010/0178022 A1 | 7/2010 | Schroeder et al. |
| 2010/0195970 A1* | 8/2010 | Mudd et al. ............... 385/135 |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0220967 A1 | 9/2010 | Cooke et al. ............... 385/135 |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0314341 A1 | 12/2010 | Bailey |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0038592 A1 | 2/2011 | Mudd |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0144630 A1* | 6/2011 | Loeb ........................ A61B 18/22 |

(56) References Cited

U.S. PATENT DOCUMENTS

| | | | 606/16 |
|---|---|---|---|
| 2011/0186532 A1 | 8/2011 | Wu | |
| 2011/0192631 A1 | 8/2011 | Burek et al. | |
| 2011/0211799 A1 | 9/2011 | Conner et al. | |
| 2011/0217014 A1 | 9/2011 | Dominique | |
| 2011/0217016 A1 | 9/2011 | Mullsteff | |
| 2011/0222821 A1 | 9/2011 | Pitwon et al. | |
| 2011/0235979 A1 | 9/2011 | Anderson et al. | |
| 2011/0249950 A1 | 10/2011 | Chapa Ramirez et al. | |
| 2011/0268404 A1 | 11/2011 | Cote et al. | |
| 2011/0268405 A1 | 11/2011 | Cote et al. | |
| 2011/0268407 A1 | 11/2011 | Cowen et al. | |
| 2011/0268408 A1 | 11/2011 | Giraud et al. | |
| 2011/0268413 A1 | 11/2011 | Cote et al. | |
| 2011/0268414 A1* | 11/2011 | Giraud et al. | 385/135 |
| 2011/0280537 A1 | 11/2011 | Cowen et al. | |
| 2011/0299823 A1 | 12/2011 | Bran De Leon et al. | |
| 2012/0025683 A1 | 2/2012 | Mattlin et al. | |
| 2012/0051707 A1 | 3/2012 | Barnes et al. | |
| 2012/0057838 A1 | 3/2012 | Hill et al. | |
| 2012/0106899 A1 | 5/2012 | Choi | |
| 2012/0183263 A1 | 7/2012 | Wu | |
| 2012/0183289 A1 | 7/2012 | Lou et al. | |
| 2012/0219263 A1 | 8/2012 | Beamon et al. | |
| 2012/0288244 A1 | 11/2012 | Wu et al. | |
| 2012/0288248 A1 | 11/2012 | Chapa Ramirez et al. | |
| 2012/0301083 A1 | 11/2012 | Carter et al. | |
| 2013/0004136 A1 | 1/2013 | Brower et al. | |
| 2013/0058616 A1 | 3/2013 | Cote et al. | |
| 2013/0077927 A1 | 3/2013 | O'Connor | |
| 2013/0209049 A1 | 8/2013 | Kowalczyk et al. | |
| 2013/0214108 A1 | 8/2013 | Irudayaraj et al. | |
| 2013/0266282 A1 | 10/2013 | Cote et al. | |
| 2013/0308916 A1 | 11/2013 | Buff et al. | |
| 2013/0322839 A1 | 12/2013 | Claessens et al. | |
| 2014/0003782 A1 | 1/2014 | Blackwell, Jr. et al. | |
| 2014/0010510 A1 | 1/2014 | Blackard | |
| 2014/0112628 A1 | 4/2014 | Keenum et al. | |

FOREIGN PATENT DOCUMENTS

| | | | | |
|---|---|---|---|---|
| CA | 2186314 | A1 | 4/1997 | |
| CA | 2 495 693 | A1 * | 2/2005 | G02B 6/38 |
| CA | 2765835 | A1 | 1/2011 | |
| CH | 688705 | A5 | 1/1998 | |
| CN | 102460258 | A | 5/2012 | |
| DE | 8711970 | U1 | 10/1987 | |
| DE | 3726718 | A1 | 2/1989 | |
| DE | 3726719 | A1 | 2/1989 | |
| DE | 4030301 | A1 | 3/1992 | |
| DE | 4231181 | C1 | 8/1993 | |
| DE | 20115940 | U1 | 1/2002 | |
| DE | 10338848 | A1 | 3/2005 | |
| DE | 202005009932 | U1 | 11/2005 | |
| DE | 202007000556 | U1 | 10/2007 | |
| DE | 102007024476 | A1 | 11/2008 | |
| DE | 202010009385 | U1 | 9/2010 | |
| EP | 29512 | A1 | 6/1981 | |
| EP | 0105597 | A2 | 4/1984 | |
| EP | 0250900 | A2 | 1/1988 | |
| EP | 0408266 | A2 | 1/1991 | |
| EP | 0474091 | A1 | 8/1991 | |
| EP | 0468671 | A1 | 1/1992 | |
| EP | 0490698 | A1 | 6/1992 | |
| EP | 0529830 | A1 | 3/1993 | |
| EP | 0544004 | A1 | 6/1993 | |
| EP | 0547778 | A1 | 6/1993 | |
| EP | 0581527 | A1 | 2/1994 | |
| EP | 0620462 | A1 | 10/1994 | |
| EP | 0693699 | A1 | 1/1996 | |
| EP | 0720322 | A2 | 7/1996 | |
| EP | 0776557 | B1 | 6/1997 | |
| EP | 0940700 | A2 | 9/1999 | |
| EP | 0949522 | A2 | 10/1999 | |
| EP | 1041417 | A2 | 10/2000 | |
| EP | 1056177 | A1 | 11/2000 | |
| EP | 1065542 | A1 | 1/2001 | |
| EP | 1162485 | A2 | 12/2001 | |
| EP | 1203974 | A2 | 5/2002 | |
| EP | 1289319 | A2 | 3/2003 | |
| EP | 1310816 | A2 | 5/2003 | |
| EP | 1316829 | A2 | 6/2003 | |
| EP | 1367308 | A1 | 12/2003 | |
| EP | 1621907 | A1 | 2/2006 | |
| EP | 1777563 | A1 | 4/2007 | |
| EP | 2060942 | A2 | 5/2009 | |
| EP | 1280363 | B1 | 9/2009 | |
| EP | 2159613 | A2 | 3/2010 | |
| EP | 2639613 | A1 | 9/2013 | |
| FR | 1586331 | A | 2/1970 | |
| FR | 2123728 | A5 | 9/1972 | |
| FR | 2378378 | A1 | 8/1978 | |
| GB | 2241591 | A | 9/1991 | |
| GB | 2277812 | A | 11/1994 | |
| GB | 2367378 | A | 4/2002 | |
| GB | 2367379 | A | 4/2002 | |
| GB | 2368136 | A | 4/2002 | |
| GB | 2377839 | A | 1/2003 | |
| JP | 3060994 | A | 3/1991 | |
| JP | 3172806 | A | 7/1991 | |
| JP | 3281378 | A | 12/1991 | |
| JP | 5045541 | A | 2/1993 | |
| JP | 06018749 | A | 1/1994 | |
| JP | 7308011 | A | 11/1995 | |
| JP | 7318761 | A | 12/1995 | |
| JP | 8007308 | A | 1/1996 | |
| JP | 8248235 | A | 9/1996 | |
| JP | 8248237 | A | 9/1996 | |
| JP | 3487946 | A | 10/1996 | |
| JP | 8254620 | A | 10/1996 | |
| JP | 3279474 | A | 10/1997 | |
| JP | 9258033 | A | 10/1997 | |
| JP | 9258055 | A | 10/1997 | |
| JP | 2771870 | B2 | 7/1998 | |
| JP | 3448448 | A | 8/1998 | |
| JP | 10227919 | A | 8/1998 | |
| JP | 3478944 | A | 12/1998 | |
| JP | 10332945 | A | 12/1998 | |
| JP | 10339817 | A | 12/1998 | |
| JP | 11023858 | A | 1/1999 | |
| JP | 2000098138 | A | 4/2000 | |
| JP | 2000098139 | A | 4/2000 | |
| JP | 2000241631 | A | 9/2000 | |
| JP | 2001004849 | A | 1/2001 | |
| JP | 3160322 | B2 | 4/2001 | |
| JP | 2001133636 | A | 5/2001 | |
| JP | 3173962 | B2 | 6/2001 | |
| JP | 3176906 | B2 | 6/2001 | |
| JP | 2001154030 | A | 6/2001 | |
| JP | 2001159714 | A | 6/2001 | |
| JP | 2002022974 | A | 1/2002 | |
| JP | 2002077236 | A | 3/2002 | |
| JP | 2002116337 | A | 4/2002 | |
| JP | 2002169035 | A | 6/2002 | |
| JP | 3312893 | B2 | 8/2002 | |
| JP | 2002305389 | A | 10/2002 | |
| JP | 3344701 | B2 | 11/2002 | |
| JP | 2003029054 | A | 1/2003 | |
| JP | 3403573 | B2 | 5/2003 | |
| JP | 2003169026 | A | 6/2003 | |
| JP | 2003215353 | A | 7/2003 | |
| JP | 2003344701 | A | 12/2003 | |
| JP | 3516765 | B2 | 4/2004 | |
| JP | 2004144808 | A | 5/2004 | |
| JP | 2004514931 | A | 5/2004 | |
| JP | 3542939 | B2 | 7/2004 | |
| JP | 2004246147 | A | 9/2004 | |
| JP | 2004361652 | A | 12/2004 | |
| JP | 2004361893 | A | 12/2004 | |
| JP | 3107704 | U | 2/2005 | |

(56) References Cited

FOREIGN PATENT DOCUMENTS

| | | | |
|---|---|---|---|
| JP | 2005055748 A | 3/2005 | |
| JP | 2005062569 A | 3/2005 | |
| JP | 2005084241 A | 3/2005 | |
| JP | 2005148327 A | 6/2005 | |
| JP | 2005257937 A | 9/2005 | |
| JP | 3763645 B2 | 4/2006 | |
| JP | 3778021 B2 | 5/2006 | |
| JP | 2006126513 A | 5/2006 | |
| JP | 2006126516 A | 5/2006 | |
| JP | 3794540 B2 | 7/2006 | |
| JP | 2006227041 A1 | 8/2006 | |
| JP | 3833638 B2 | 10/2006 | |
| JP | 2006292924 A | 10/2006 | |
| JP | 3841344 B2 | 11/2006 | |
| JP | 3847533 B2 | 11/2006 | |
| JP | 200747336 A | 2/2007 | |
| JP | 3896035 B2 | 3/2007 | |
| JP | 2007067458 A1 | 3/2007 | |
| JP | 3934052 B2 | 6/2007 | |
| JP | 3964191 B2 | 8/2007 | |
| JP | 3989853 B2 | 10/2007 | |
| JP | 4026244 B2 | 12/2007 | |
| JP | 4029494 B2 | 1/2008 | |
| JP | 4065223 B2 | 3/2008 | |
| JP | 4093475 B2 | 6/2008 | |
| JP | 4105696 B2 | 6/2008 | |
| JP | 4112437 B2 | 7/2008 | |
| JP | 4118862 B2 | 7/2008 | |
| JP | 2008176118 A1 | 7/2008 | |
| JP | 2008180817 A1 | 8/2008 | |
| JP | 4184329 B2 | 11/2008 | |
| JP | 2008271017 A | 11/2008 | |
| JP | 2008542822 T | 11/2008 | |
| JP | 2009503582 T | 1/2009 | |
| JP | 2009229506 A | 10/2009 | |
| JP | 2012065019 A | 3/2012 | |
| KR | 20110037404 A | 4/2011 | |
| WO | 9105281 A1 | 4/1991 | |
| WO | 9326070 A1 | 12/1993 | |
| WO | 9520175 A1 | 7/1995 | |
| WO | 9636896 A1 | 11/1996 | |
| WO | 9638752 A1 | 12/1996 | |
| WO | 9712268 A1 | 4/1997 | |
| WO | 9722025 A1 | 6/1997 | |
| WO | 9736197 A1 | 10/1997 | |
| WO | 9744605 A1 | 11/1997 | |
| WO | 9825416 A1 | 6/1998 | |
| WO | 9927404 A1 | 6/1999 | |
| WO | 0005611 A2 | 2/2000 | |
| WO | 0127660 A2 | 4/2001 | |
| WO | 0130007 A2 | 4/2001 | |
| WO | 0180596 A1 | 10/2001 | |
| WO | 0242818 A1 | 5/2002 | |
| WO | 03009527 A2 | 1/2003 | |
| WO | 03014943 A1 | 2/2003 | |
| WO | 2004052066 A1 | 6/2004 | |
| WO | 2005020400 A1 | 3/2005 | |
| WO | 2006076062 A | 7/2006 | |
| WO | 2006108024 A1 | 10/2006 | |
| WO | 2007050515 A1 | 5/2007 | |
| WO | 2007079074 A2 | 7/2007 | |
| WO | 2007089682 A2 | 8/2007 | |
| WO | 2007149215 A2 | 12/2007 | |
| WO | 2008027201 A2 | 3/2008 | |
| WO | 2008063054 A2 | 5/2008 | |
| WO | 2008113054 A2 | 9/2008 | |
| WO | 2008157248 A1 | 12/2008 | |
| WO | 2009026688 A1 | 3/2009 | |
| WO | 2009029485 A1 | 3/2009 | |
| WO | 2009030360 A1 | 3/2009 | |
| WO | 2009120280 A2 | 10/2009 | |
| WO | 2010024847 A2 | 3/2010 | |
| WO | 2010080745 A1 | 7/2010 | |
| WO | 2011005461 A1 | 1/2011 | |
| WO | 2011059955 A1 | 5/2011 | |

OTHER PUBLICATIONS

Final Office Action for U.S. Appl. No. 13/795,888 mailed Feb. 18, 2015, 26 pages.
Non-final Office Action for U.S. Appl. No. 13/539,683 mailed Jul. 24, 2014, 10 pages.
Non-final Office Action for U.S. Appl. No. 14/060,966 mailed Jul. 31, 2014, 10 pages.
Non-final Office Action for U.S. Appl. No. 13/795,888 mailed Aug. 1, 2014, 23 pages.
International Search Report for PCT/US2013/048102 mailed Aug. 26, 2013, 3 pages.
Final Office Action for U.S. Appl. No. 13/539,683 mailed Nov. 13, 2014, 9 pages.
Notice of Allowance for U.S. Appl. No. 14/060,966 mailed Nov. 19, 2014, 11 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
Corning Cable Systems, "MTX Frames and Accessories," Feb. 2006, 4 pages.
Panduit, "Lock-in LC Duplex Clip," Accessed Mar. 22, 2012, 1 page.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
"MPO Fiber Optic Rack Panels now available from L-com Connectivity Products," article dated Jun. 4, 2007, 16 pages, http://www.l-com.com/content/Article.aspx?Type=P&ID=438.
"19 Rack Panel with 16 MPO Fiber Optic Couplers—1U high," product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Unknown, Author, "QuickNet SFQ Series MTP Fiber Optic Cassettes," Panduit Specification Sheet, Jan. 2009, 2 pages.

(56) References Cited

OTHER PUBLICATIONS

Unknown Author, "Cellular Specialties introduces the first simulated in-building location-based tracking solution," smart-grid.tmenet.com/news, Sep. 14, 2009, 2 pages.

Unknown Author, "CDMA Co-Pilot Transmitter," Cellular Specialties, Inc., Aug. 2009, 2 pages.

Ramdas, "Modern File Systems and Storage," Proceedings of the 2nd International SANE Conference, May 22-25, 2000, MECC, Maastricht, The Netherlands, Copyright Rodney R. Ramdas, 10 pages.

Author Unknown, "144 Fiber Patch Panel 1U," Technical Data, ADTEK Group Limited, 2009, 2 pages.

Author Unknown, "FiberManager Frame Cross-connect Configuration Fiber Tracing Option: Installation and Maintenance," Siecor Corporation, A0402884, Release 04.00, Jul. 1995, 80 pages.

Author Unknown, "FOS-FDF", Corning Cable Systems, SRP-003-305, Issue 4, Mar. 2001, 17 pages.

Author Unknown, "Optical Management Shelf (OMS)," Corning Cable Systems, Standard Recommended Procedure (SRP) 003-600, Issue 3, Apr. 2004, 9 pages.

Author Unknown, "Single Shelf HDF Installation," Standard Recommended Procedure (SRP) 003-377, Corning Cable Systems, Issue 5, Aug. 2001, pp. 1-12.

Patent Cooperation Treaty, International Search Report for PCT/US11/58001, Jan. 30, 2012, 2 pages.

Chinese Office action for application No. 201180055780.4, dated May 4, 2015, 12 pages.

\* cited by examiner

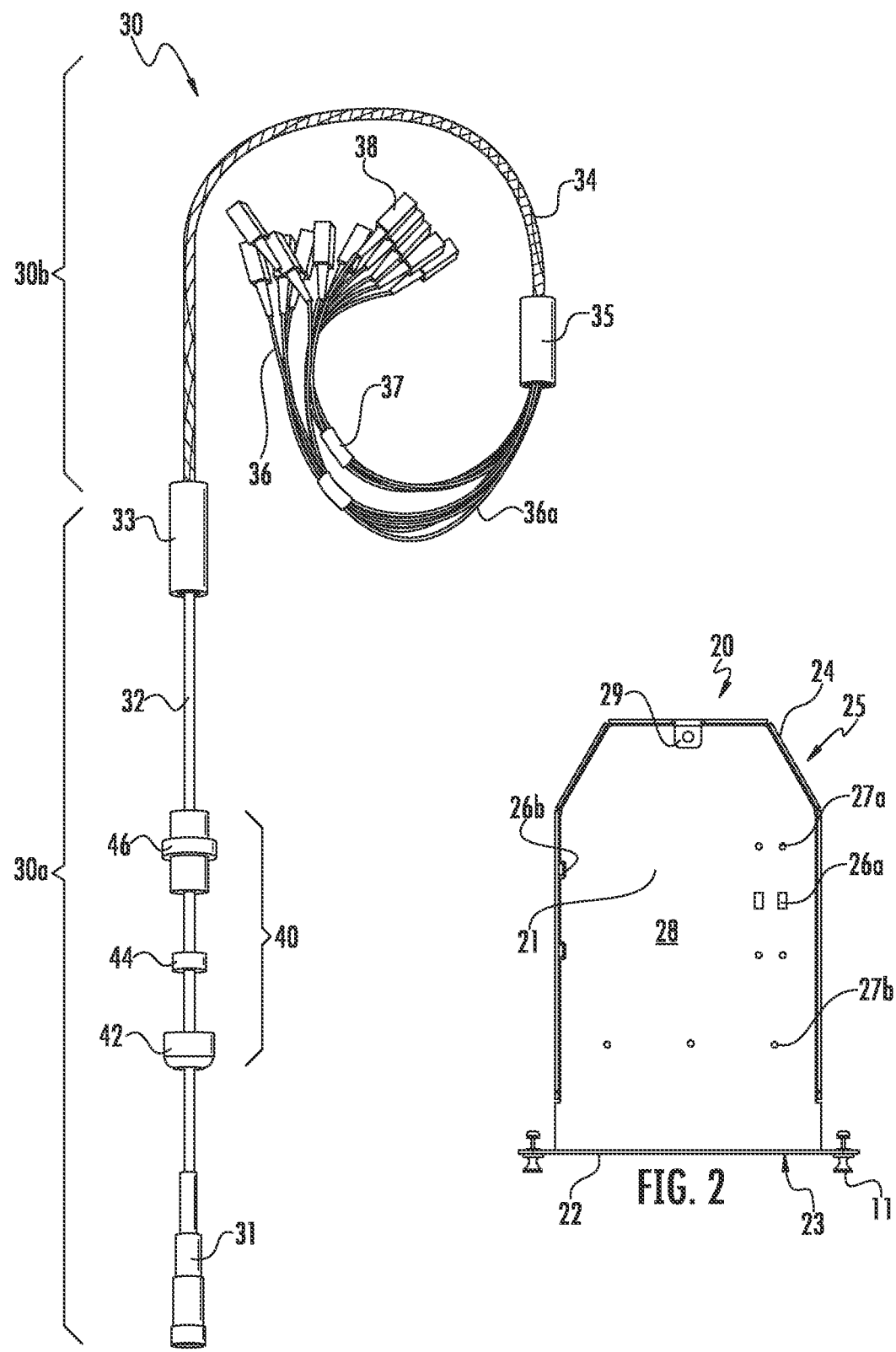

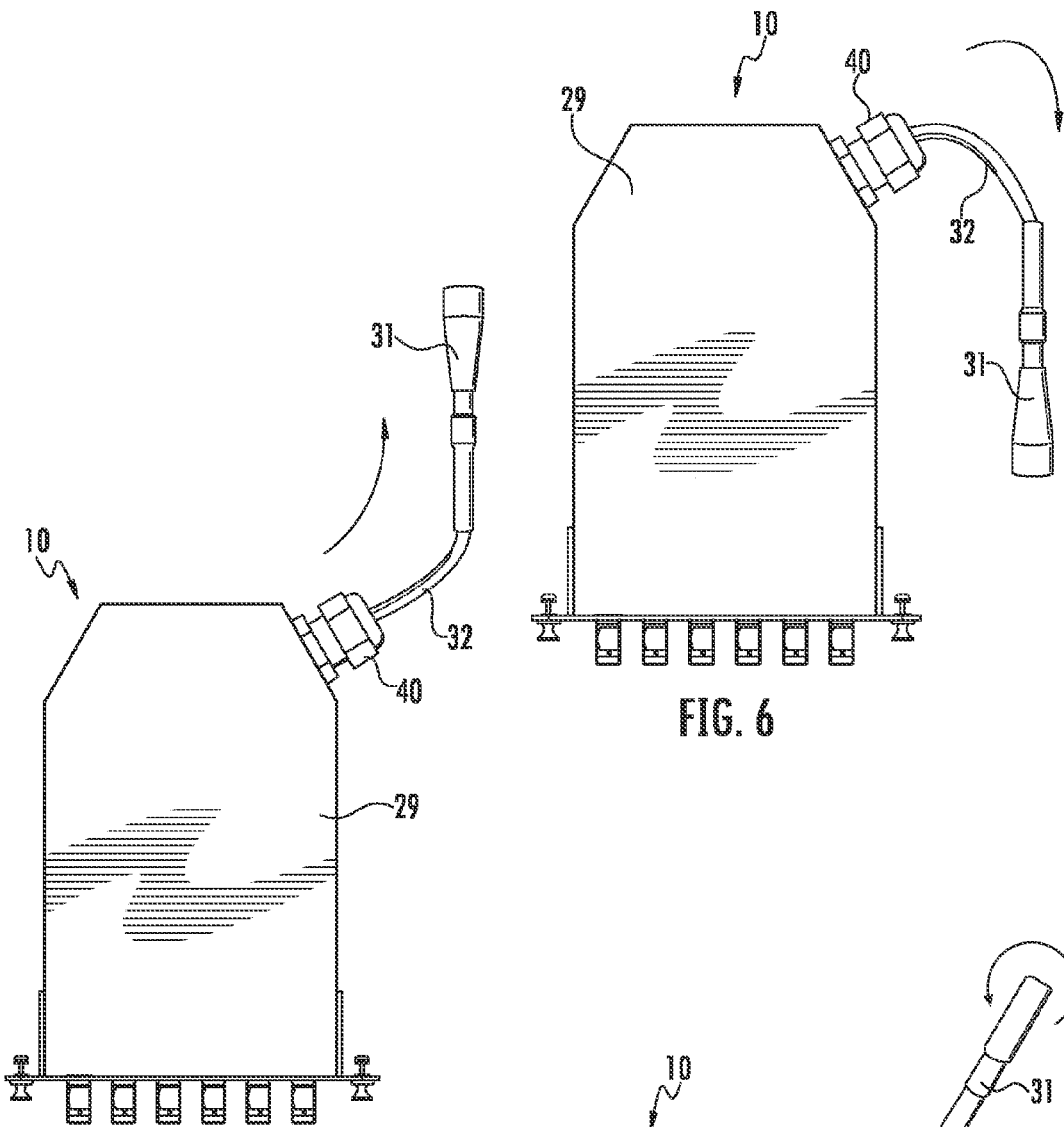
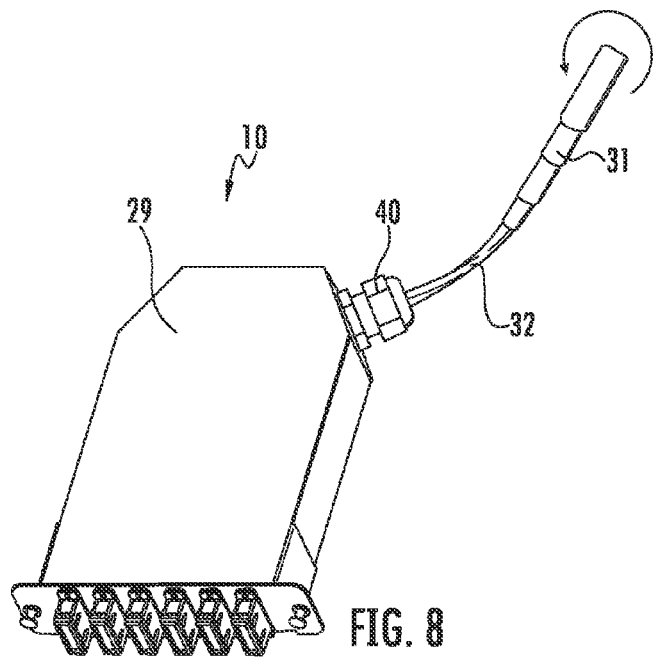

FIBER OPTIC MODULE FOR LIMITED SPACE APPLICATIONS HAVING A PARTIALLY SEALED MODULE SUB-ASSEMBLY

CROSS-REFERENCE TO RELATED APPLICATIONS

This application claims the priority under 35 U.S.C. §119 of U.S. Provisional Application Ser. No. 61/407,195, filed on Oct. 27, 2010, and U.S. Provisional Application Ser. No. 61/426,212 filed on Dec. 22, 2010 the contents of which are relied upon and incorporated herein by reference in their entirety.

BACKGROUND

1. Field of the Disclosure

The disclosure relates generally to fiber optic module assemblies and more particularly to fiber optic module assemblies having flexible cables extending outside of the module assembly which may be used in limited space applications.

2. Technical Field

In the field of fiber optics, installation space and operator access are not unlimited. In some applications, for example, retro-fitting an existing fiber optic system or placing fiber optic systems into unusual locations, it is not always convenient for operators to install, test, troubleshoot or otherwise maintain optical systems. For example, in Fiber to the Antenna (FTTA) applications, fiber optic systems are typically placed into small cabinets, boxes or canisters that are not always properly sealed. Exposure to environmental stresses, e.g., temperature extremes, humidity and particulate intrusion, to name a few, can adversely affect optical performance or even damage components. Driven by high capacity demands, such systems rely upon multi-fiber cables and multi-fiber connectors that are sensitive to environmental stresses. Space constraints make replacing compromised components difficult. What is needed is a fiber optic module that has installation flexibility as well as integral sealing of sensitive components to mitigate any environmental and physical constraints.

No admission is made that any reference cited herein constitutes prior art. Applicant expressly reserves the right to challenge the accuracy and pertinency of any cited documents.

SUMMARY

One aspect of the disclosure relates to a fiber optic module. The fiber optic module may include a module housing defining an interior space, at least one adapter aperture and at least one input aperture. A module sub-assembly may be received in the fiber optic module, the sub-assembly including at least one fiber optic cable passing through, for example, the at least one input aperture, at least one multi-fiber connector on an end of the fiber optic cable, and at least one single fiber connector on an opposite end of the fiber optic cable. The multi-fiber connector may be in optical communication with the at least one single fiber connector, the multi-fiber connector capable of flexing on the at least one fiber optic cable relative to the module housing.

An additional aspect of the disclosure relates to a module sub-assembly, including at least one fiber optic cable, at least one multi-fiber connector on an end of the fiber optic cable, and at least one single fiber connector on an opposite end of the fiber optic cable. The multi-fiber connector may be in optical communication with the at least one single fiber connector. The sub-assembly may further include a demarcation and a furcation, the demarcation being located along the at least one fiber optic cable between the multi-fiber connector and the furcation, the furcation being located along the at least one fiber optic cable between the demarcation and the at least one single fiber connector. Furthermore, the sub-assembly may include a compression fitting, the compression fitting being about the at least one fiber optic cable between the demarcation and the multi-fiber connector.

An additional aspect of the disclosure relates to embodiments of a surface mountable module assembly, including brackets for holding the fiber optic module, for example, flush to a mounting surface, at an angle to a mounting surface, and orthogonal to a mounting surface.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

According to common practice, the various features of the drawings discussed below are not necessarily drawn to scale. Dimensions of various features and elements in the drawings may be expanded or reduced to more clearly illustrate the embodiments of the invention.

BRIEF DESCRIPTION OF THE DRAWINGS

FIG. 2 is a top view of an exemplary module housing of the module of FIG. 1;

FIG. 3 is partially exploded view of an exemplary module sub-assembly of the module of FIG. 1;

FIGS. 6-8 are top views of the module of FIG. 1 having a cover installed showing the flexibility of the module sub-assembly;

DETAILED DESCRIPTION

Figure 1:
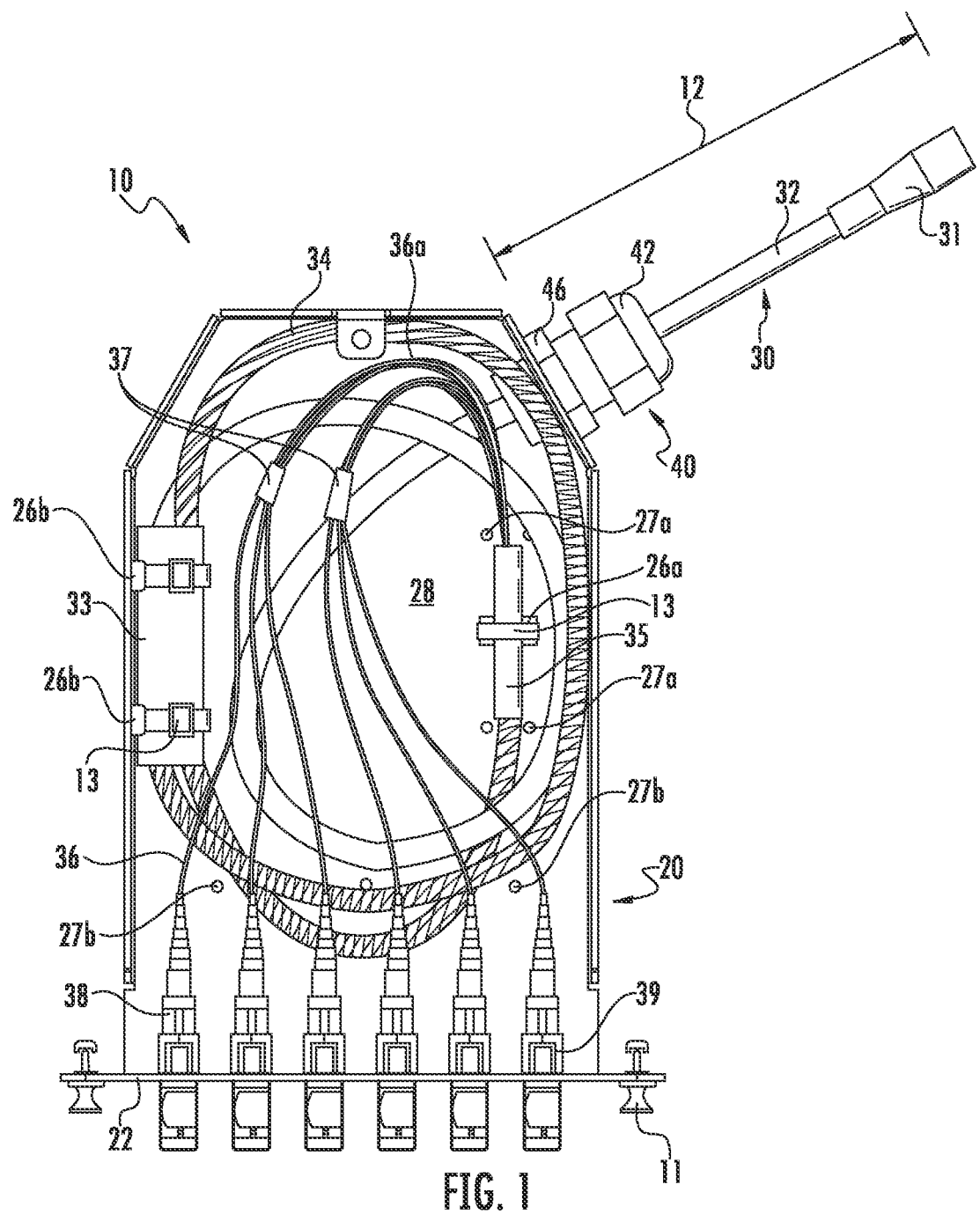
FIG. 1 is a top view of a fiber optic module having a partially sealed module sub-assembly.

Reference is now made in detail to exemplary embodiments of the disclosure, examples of which are illustrated in the accompanying drawings. Whenever possible, identical or similar reference numerals are used throughout the drawings to refer to identical or similar parts.

The disclosure herein is to a fiber optic module assembly having at least one module sub-assembly and a module housing for receiving the module sub-assembly. The module sub-assembly defines a fiber optic harness that may be disposed partially inside the module housing and partially outside the module housing, the external portion being flexible relative to the module housing. In exemplary embodiments, a hardened multi-fiber connector, suitable for extreme environmental exposure, may be on an end of the module sub-assembly that is partially outside of the module housing. The module sub-assembly may include a sealed portion and an unsealed portion, the sealed portion being partially disposed outside of the module housing. The flexibility of the external portion of the module sub-assembly enables ease of access, for example, when connecting another cable to the module assembly, by allowing freedom of movement of the external portion of the module sub-assembly. Furthermore, the disclosure relates to apparatuses for mounting the module assembly, for example, to a mounting surface, a wall, a cabinet and a rack.

A fiber optic module 10 (FIG. 1) may include a module housing 20 and a partially sealed module sub-assembly 30. Sub-assembly 30 may be at least partially located within module housing 20. A portion of sub-assembly 30 may, in exemplary embodiments, be located partially outside of module housing 20 by a distance 12. Distance 12 may be defined as an exterior distance from module housing 20 to an end of sub-assembly 30. In exemplary embodiments, distance 12 may be adjustable, for example, from a first distance of 5-10 centimeters (cm) to a second distance of 15-20 centimeters.

Module housing 20 (FIGS. 1 and 2) may include a bottom 21 and at least two walls, e.g., a first wall 22 and a second wall 24. In exemplary embodiments, first wall 22 and second wall 24 may extend from bottom 21. Module housing 20, in exemplary embodiments, defines at least one connector adapter aperture 23, for example, positioned on first wall 22, and in further exemplary embodiments defines at least one input aperture 25, for example, positioned on second wall 24. Adapter aperture 23 and input aperture 25 may provide access to an interior space 28. In exemplary embodiments, the at least two walls may be substantially aligned to each other, for example, may be substantially parallel. In other exemplary embodiments the at least two walls may be substantially at angles relative to each other, for example, not substantially parallel, and in yet other exemplary embodiments the at least two walls may be about 60 degrees relative to each other.

Module housing 20 may further include at least one attachment feature, and in exemplary embodiments, a plurality of attachment features 26a, 26b located within interior space 28, for securing module sub-assembly 30 within module housing 20. For example, module sub-assembly 30 may be secured in part by attachment feature 26a and in part by attachment feature 26b. Attachment features 26a, 26b may be selected from attachment features being selected from the group consisting of a hook, a tab, an aperture, a push-out feature, and combinations of the same. In exemplary embodiments, attachment features 26a, 26b are sheet metal push-out features and may cooperate with, for example, a secondary securing means, for example, a strap or a tie, for securing module sub-assembly 30.

Module sub-assembly 30 (FIGS. 1 and 3), may include a sealed portion 30a and an unsealed portion 30b. Sealed portion 30a may include at least one fiber optic cable 32 having at least one optical fiber disposed inside, at least one multi-fiber connector 31 on one end of sub-assembly 30 in communication with the at least one optical fiber. More specifically, multi-fiber connector 31 may be a hardened multi-fiber connector disposed on an end of cable 32. Cable 32 may be, for example, a rugged drop cable such as SST Flat Indoor/Outdoor Drop Cable available from Corning Cable Systems, Hickory NC. A demarcation 33 may be disposed, for example, on the other end of cable 32, providing a sealed portion 30a. Demarcation 33 may be, for example, a tube for receiving cable 32 at an end of the tube, with the at least one optical fiber passing through the tube. A curable sealant, for example, epoxy or RTV, may be disposed inside the tube, surrounding the end of cable 32 and the at least one optical fiber, locking cable 32 and the at least one optical fiber inside the tube. Sealed portion 30a may be sealed, for example, from environmental influences, including, but not limited to, dust and water intrusion. Multi-fiber connector 31, being a hardened connector, for example, an OptiTip® Connector available from Corning Cable Systems (though other hardened connectors are possible), is sealed in an unconnected state by a threaded dust cap, and in a connected state by connection to another hardened connector 19 (see FIG. 14), or a hardened adapter, sealing sealed portion 30a.

Unsealed portion 30b may include, in exemplary embodiments, a furcation 35 disposed on an end of an unsealed cable 34, for example, the at least one optical fiber exiting the other end of demarcation 33. In exemplary embodiments, unsealed cable 34 exits demarcation 33 and enters furcation 35. Unsealed cable 34, in some embodiments, may be at least one multi-fiber ribbon, for example, at least one 12 fiber ribbon, encased, for example, by a braided sleeve. In exemplary embodiments, furcation 35 may transition the at least one multi-fiber ribbon from a ribbon into at least one single optical fiber 36. Upon exiting furcation 35, a plurality of single optical fibers 36 may be grouped into at least one bundle 36a by the application of, for example, a wrap 37, for routing. Each of single optical fibers 36 may be terminated by a single fiber connector 38, for example, such as DC,SC, SC-APC, and LC connectors to name a few. In exemplary embodiments, the 12 fiber ribbon is furcated by furcation 35 into 12 single optical fibers 36, which are terminated by 12 SC-APC connectors. It should be understood that in exemplary embodiments each of single fiber connectors 38 is in optical communication with multi-fiber connector 31 by way of a single optical fiber that terminates at both multi-fiber connector 31 and single fiber connector 38.

In exemplary embodiments, a compression fitting 40 may be disposed on cable 32 between connector 31 and furcation 33, including a treaded nut 42, a grommet 44 and a threaded body 46, grommet 44 being between threaded nut 42 and threaded body 46. Compression fitting 40 may engage, for example, input aperture 25 for securing module sub-assembly 30 to housing 20. Grommet 44 may include an opening having an inner profile that closely matches the outer profile of cable 32. Grommet 44 may be made from, for example, an elastomer that when compressed by tightening threaded nut 42 to threaded body 46 grips cable 32 with a compressive force and holds sub-assembly 30. Compression fitting 40 enables adjustments to distance 12 by loosening threaded nut 42, releasing the compressive force, allowing cable 32 to slide temporarily within grommet 44 for making distance 12 greater or smaller, then retightening threaded nut 42 to lock cable 32 at desired distance 12.

In exemplary embodiments, module sub-assembly 30 may be routed interior space 28 by coiling module sub-assembly 30. Cable 32, being secured to housing 20 at input aperture 25 by, for example, compression fitting 40, may be coiled at least once, placing demarcation 33 alongside attachment features 26b. In exemplary embodiments, cable 32 may be proximate to bottom 21, and may rest against alignment pins 27b to prevent any unwanted cable movement. A fastener 13, for example, a cable tie, zip-tie or tie-wrap, may engage each of attachment features 26b, wrapping around demarcation 33, thus holding demarcation 33 alongside alignment features 26b. Unsealed cable 34 may be further coiled at least once, for example, above cable 32, placing furcation 35 along or between attachment features 26a. Another fastener 13 may engage attachment features 26a, wrapping around furcation 35. In some exemplary embodiments, furcation 35 may be nestled substantially between other alignment pins 27a, for example, to prevent furcation 35 from twisting under torque generated by the shape memory of cable 32 and unsealed cable 34. Single optical fibers 36, and corresponding bundles 36a may be routed from furcation 35 to place single fiber connectors 38 proximal to adapter apertures 23. Single fiber connectors 38 each may be inserted into one of a plurality of adapters 39 disposed at adapter apertures 23. In exemplary embodiments, adapters 39 are duplex adapters configured to receive two each of connectors 38.

Figure 4:
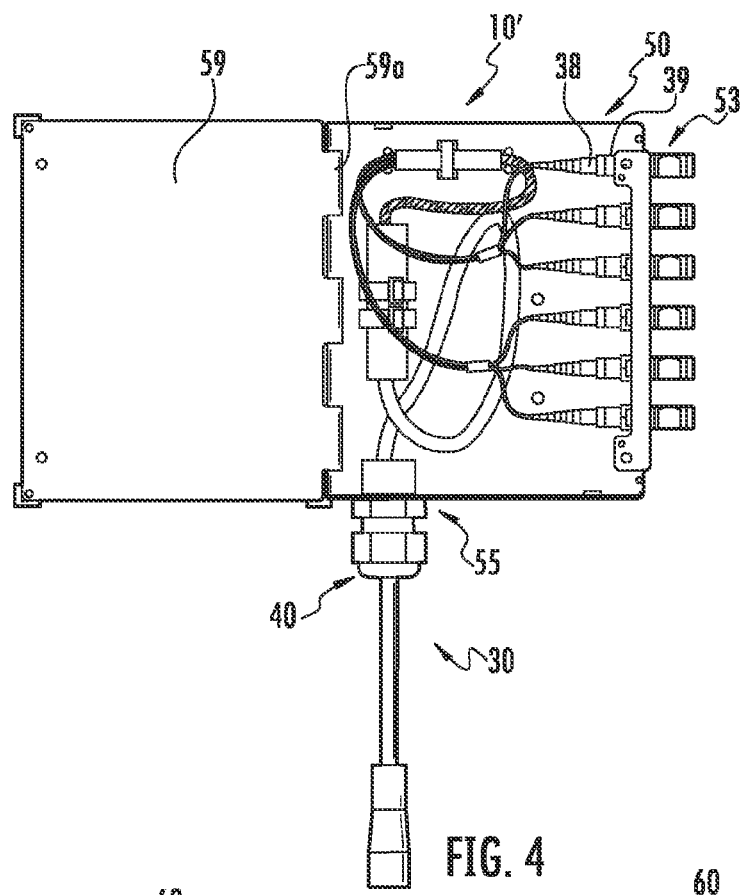
FIG. 4 is a top view of another an alternate module having a hinged cover and the module sub-assembly of FIG. 3.

In alternate embodiments, a first alternate fiber optic module 10' (FIG. 4) may include alternate module housing 50 having a cover 59 attached to housing 50 by a hinge 59a. Module sub-assembly 30 may be secured to housing 50 through a first alternate input aperture 55. A plurality of alternate adapter apertures 53 may receive adapters 39. Connectors 38 may be inserted into adapters 39.

Figure 5:
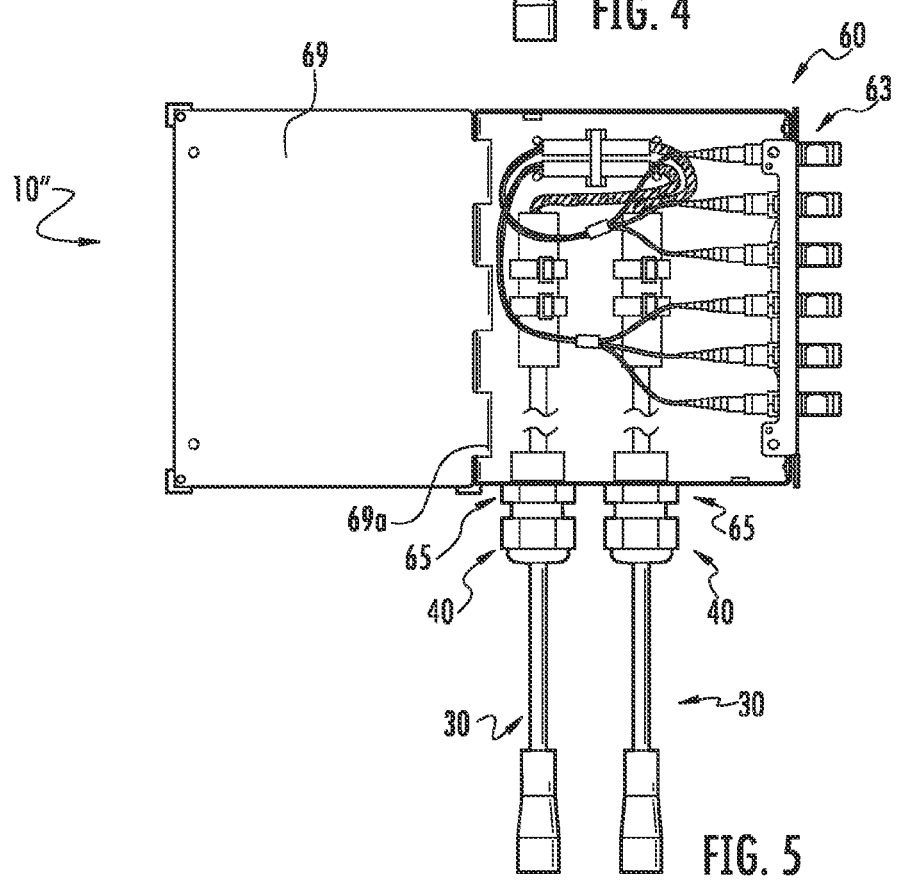
FIG. 5 is a top view of yet another alternate module having a hinged cover and two module sub-assemblies of FIG. 3.

In yet another alternate embodiment, a second alternate fiber optic module 10" (FIG. 5) may include alternate module housing 60 having a cover 69 attached to housing 60 by a hinge 69a. A pair of module sub-assemblies 30 may be secured to housing 60 through a pair of alternate input apertures 65. A plurality of alternate adapter apertures 63 may receive adapters 39. Connectors 38 may be inserted into adapters 39.

In exemplary embodiments, multi-fiber connector 31 may be capable of flexing on, for example, cable 32, relative to module housing 20 (FIGS. 6-8). Having distance 12 between connector 31 and housing 20 exposes a length of cable 32, enabling flexing. In representative embodiments, connector 31 may flex up to 180 degrees relative to housing 20, easing routing of, for example, trunk cables in situations where space and access are limited. Flexing may be limited only by physical constraints of the kind of cable used in sub-assembly 30; for example, if cable 32 is a bend preferential cable such as a flat drop cable, bending may be substantially free in X and Y axes. Z axis flexing may be realized by applying torsion to connector 31, the torsion being transmitted to cable 32, twisting cable 32 up to 90 degrees. If cable 32, for example, is a non-preferential bend cable, flexing may be substantially limited only by environmental constraints; for example, limited spatial freedom to flex. In exemplary embodiments, connector 31 may flex toward first wall 22 up to 120 degrees (FIG. 6), effectively pointing connector 31 toward front wall 22, enabling connection to, for example, another fiber optic connector on a trunk cable that may be routed from the front of module 10. In another exemplary embodiment, connector 31 may flex away from first wall 22 up to 60 degrees (FIG. 7), effectively pointing connector 31 away from front wall 22, enabling connection to, for example, yet another fiber optic connector on another trunk cable that may be routed from the rear of module 10. Of course, cables being routed from any intervening direction may be connected to connector 31. In yet another exemplary embodiment, sub-assembly 30 may twist (FIG. 8) by the application of a torque to connector 31, enabling flexibility in the Z axis to accommodate, for example, connection to yet another fiber optic connector on yet another trunk cable being routed, for example, from above or below module 10.

Figure 9:
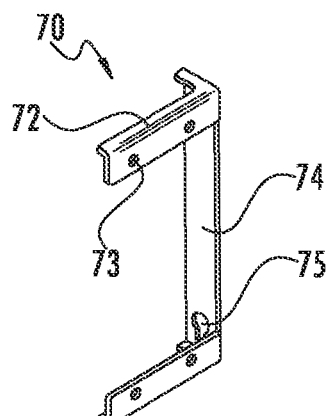
FIG. 9 is a perspective view of a side insertion mounting bracket.
Figure 10:
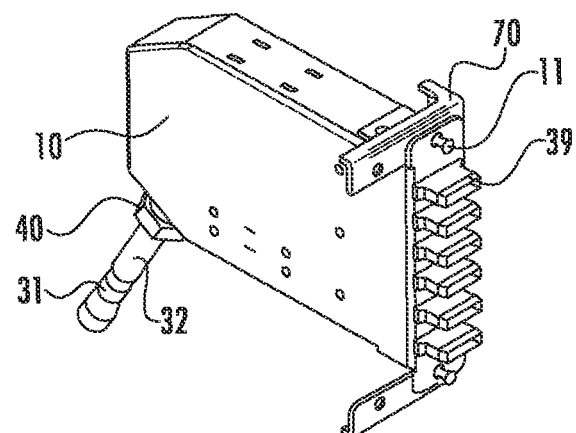
FIG. 10 is perspective view of the mounting bracket of FIG. 9 having the module of FIG. 1 installed.

Flexibility of sub-assembly 30 relative to, for example, housing 20, may expand installation opportunities for module 10. Module 10 may be installed in any one of a plurality of wall mountable module assemblies. In an exemplary wall mountable module assembly, a side insertion mounting bracket 70 (FIG. 9), in an exemplary embodiment, may include at least one first leg 72 defining a module mounting area having at least one module mounting aperture 73 for engaging push-lock pins 11 (FIG. 10). Mounting bracket 70 may have at least one second leg 74 defining a surface, or wall, mounting area that may have at least one mounting surface aperture 75. First leg 72 and second leg 74, in exemplary embodiments, may be orthogonal to each other for mounting at least one module 10 to a mounting surface, for example, a wall, with at least one module 10 engaging mounting bracket 70 substantially in alignment with the mounting surface. Put another way, mounting bracket 70 enables at least one module 10 to be mounted substantially flush to a wall or other mounting surface (see FIG. 19). In exemplary embodiments, a plurality of modules 10 may be mounted together in mounting bracket 70 in substantially the same alignment without occupying large amounts of, for example, wall area or cabinet volume. Side mounting bracket 70 may be made from a plastic or a metal, and in exemplary embodiments may be a stamped sheet metal bracket.

Figure 11:
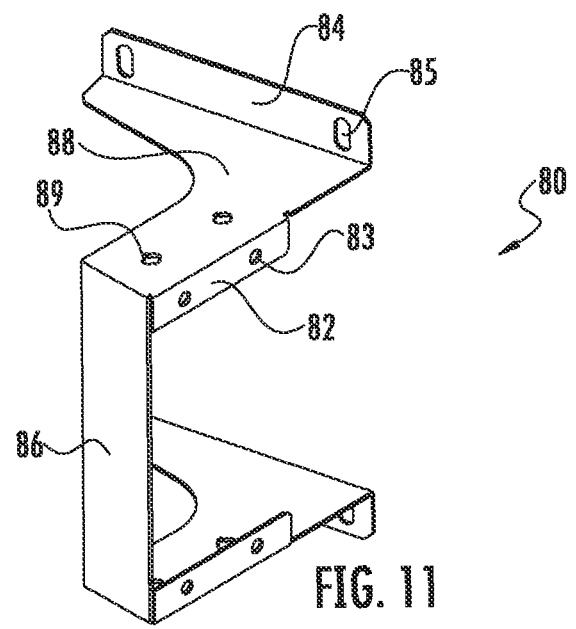
FIG. 11 is a perspective view of an angular insertion mounting bracket.
Figure 12:
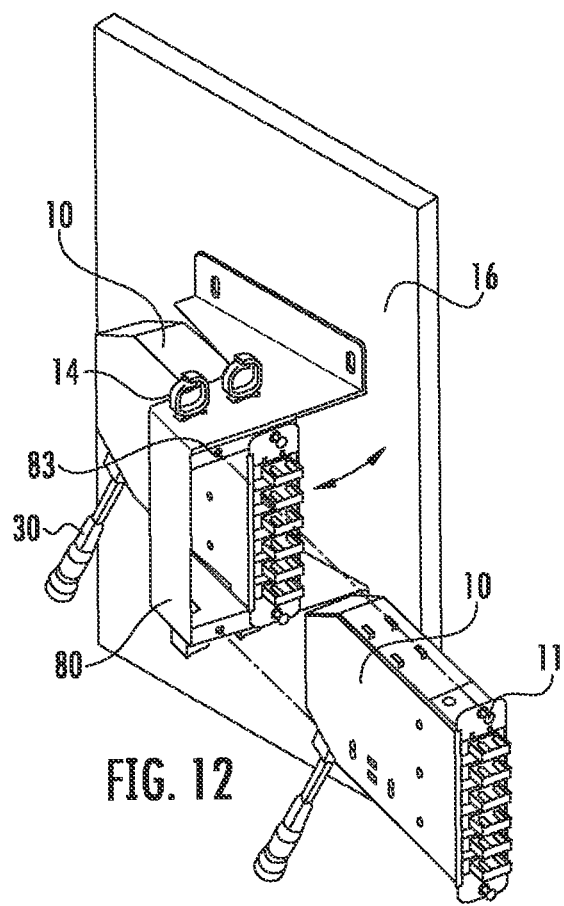
FIG. 12 is a partially exploded view of the mounting bracket of FIG. 11 receiving the module of FIG. 1.

In another exemplary wall mountable module assembly embodiment, an angular insertion mounting bracket 80 (FIG. 11) may mount, in exemplary embodiments, at least one module 10 at an angle to a mounting surface. Module 10 may engage mounting bracket 80 at an angle, for example, greater than zero degrees but less than 90 degrees, relative to the mounting surface, for example, a wall. In exemplary embodiments, module 10 may engage mounting bracket 80 at a 15 degree angle relative to the mounting surface. Angular mounting bracket 80 may include at least one first leg 82 defining another module mounting area having at least one module mounting aperture 83 for engaging push-lock pins 11 (FIG. 12). Mounting bracket 80 may have at least one second leg 84 defining another surface, or wall, mounting area that may have at least one mounting surface aperture 85. First leg 82 and second leg 84, in exemplary embodiments, may be non-orthogonal to each other for mounting at least one module 10 to a mounting surface, for example, a wall, with at least one module 10 engaging mounting bracket 80 substantially an angle less than 90 degrees, for example, 75 degrees, relative the mounting surface. Put another way, mounting bracket 80 enables at least one module 10 to be inserted at an angle less than 90 degrees to a wall or other mounting surface (see FIGS. 12 and 19). In exemplary embodiments, a plurality of modules 10 may be mounted together in mounting bracket 80 in substantially the same alignment without occupying large amounts of, for example, wall area or cabinet volume. Angled mounting bracket 80 may be made from a plastic or a metal, and in exemplary embodiments may be a stamped sheet metal bracket.

At least one vertical support 86 may be in communication with at least one horizontal support 88. Horizontal support 88 may include at least one routing guide aperture 89 for receiving, for example, a routing guide 14 or clip for routing jumper cables (not shown) that may connect to adapters 39. Vertical support 86, in exemplary embodiments, may be at about a 15 degree angle to second leg 84 and orthogonal to first leg 82.

Figure 13:
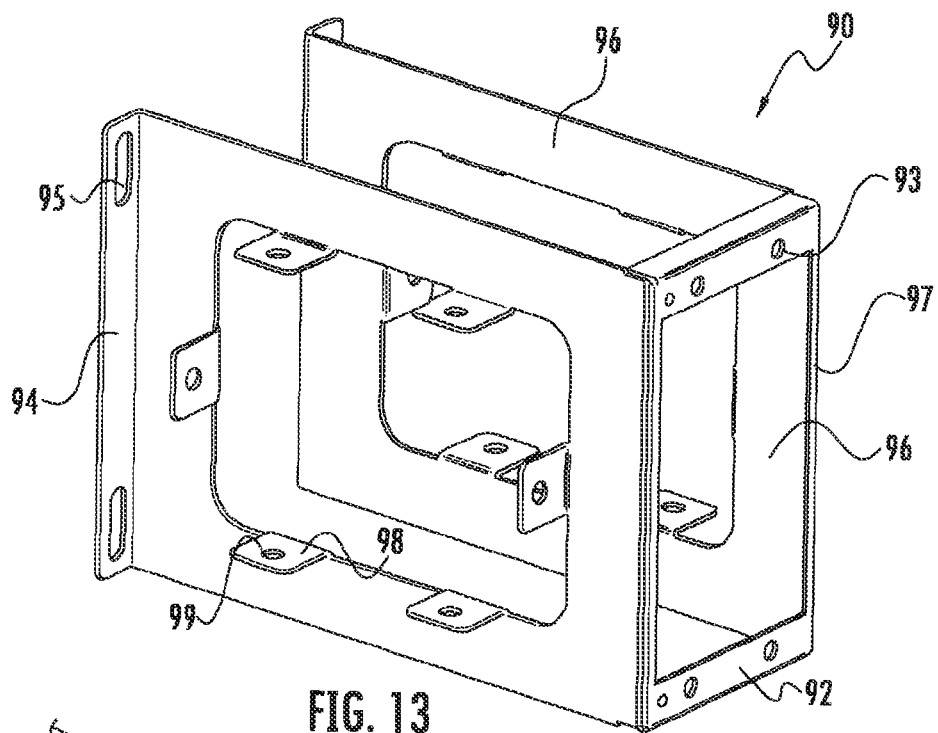
FIG. 13 is a perspective view of a front insertion mounting bracket.
Figure 14:
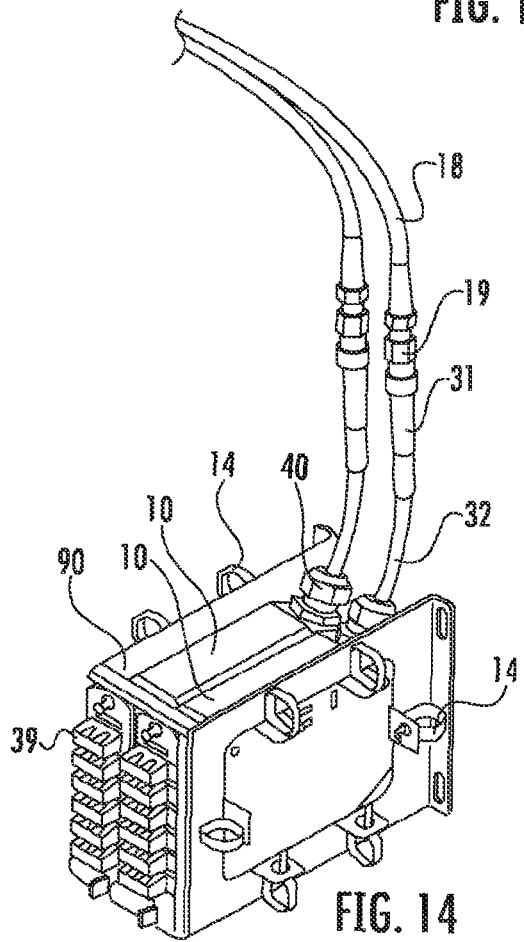
FIG. 14 is a perspective view of the mounting bracket of FIG. 13 having two of the modules of FIG. 1 installed.

In yet another wall mountable module assembly embodiment, an orthogonal insertion mounting bracket 90 (FIG. 13) may mount, in exemplary embodiments, at least one module 10 orthogonal to a mounting surface, for example, a wall in a data closet or cabinet. Module 10 may engage mounting bracket 90 orthogonal to the mounting surface, for example, a wall. Angular mounting bracket 90 may include at least one first leg 92 defining yet another module mounting area having at least one module mounting aperture 93 for engaging push-lock pins 11 (FIG. 14). Mounting bracket 90 may have at least one second leg 94 defining yet another surface, or wall, mounting area that may have at least one mounting surface aperture 95. First leg 92 and second leg 94, in exemplary embodiments, may be substantially aligned to each other for mounting at least one module 10 to a mounting surface, for example, a wall, with at least one module 10 engaging mounting bracket 90 substantially an angle of about 90 degrees relative the mounting surface. Put another way, mounting bracket 90 enables at least one module 10 to be inserted straight in to a wall or other mounting surface (see FIGS. 14 and 19). In exemplary embodiments, a plurality of modules 10 may be mounted together in mounting bracket 80 in substantially the same alignment without occupying large amounts of, for example, wall area or cabinet volume. Orthogonal mounting bracket 90 may be made from a plastic or a metal, and in exemplary embodiments may be a stamped sheet metal bracket.

At least one vertical support 96 may cooperate with two front legs 92 to define an insertion aperture 97. Further, vertical support 96 may be in communication with at least one tab 98. Tab 98 may include at least one routing guide aperture 99 for receiving, for example, a routing guide 14 or similar clip for routing jumper cables (not shown) that may connect to adapters 39. Vertical support 96, in exemplary embodiments, may be orthogonal to second leg 94 and first leg 92.

By way of example, an exemplary trunk cable 18 having a trunk connector 19, for example, capable of mating with connector 31, may be routed from substantially above the wall mounted module assembly located in orthogonal insertion mounting bracket 90 (FIG. 14). Connector 31 may flex on cable 32 to accommodate the overhead routing, effectively laying alongside the mounting surface (not shown).

Figure 15:
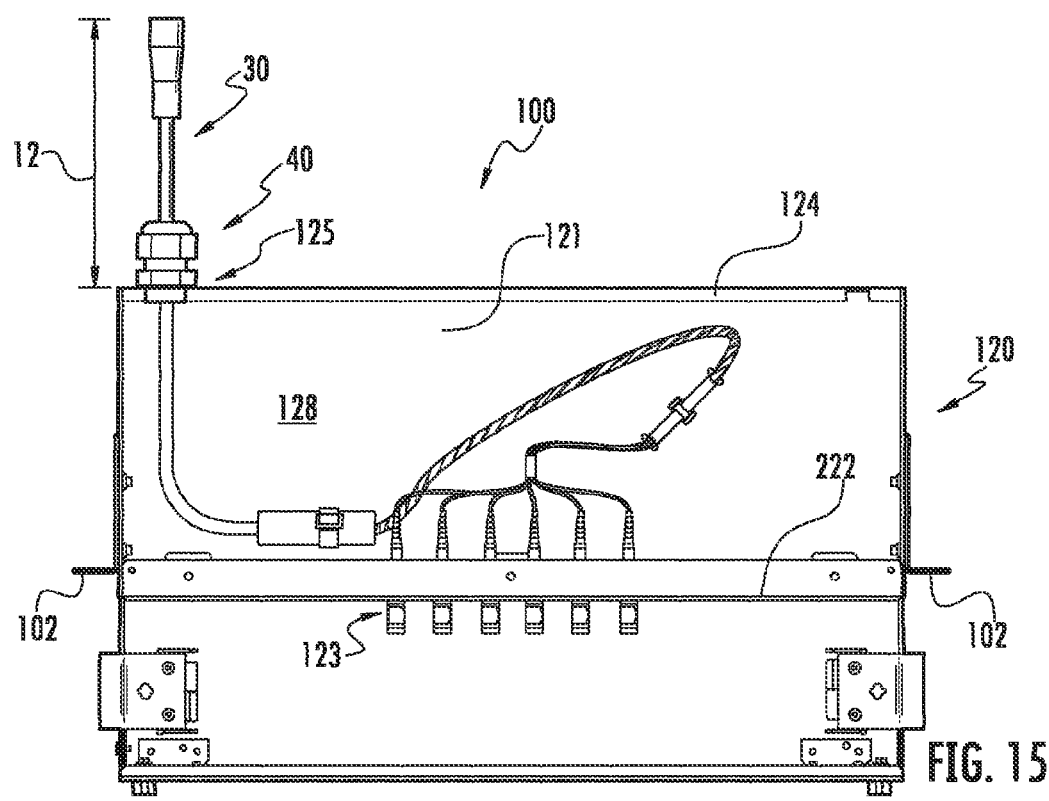
FIGS. 15 and 16 are top views of two embodiments of a rack mountable module assembly having the module sub-assembly of FIG. 3.
Figure 16:
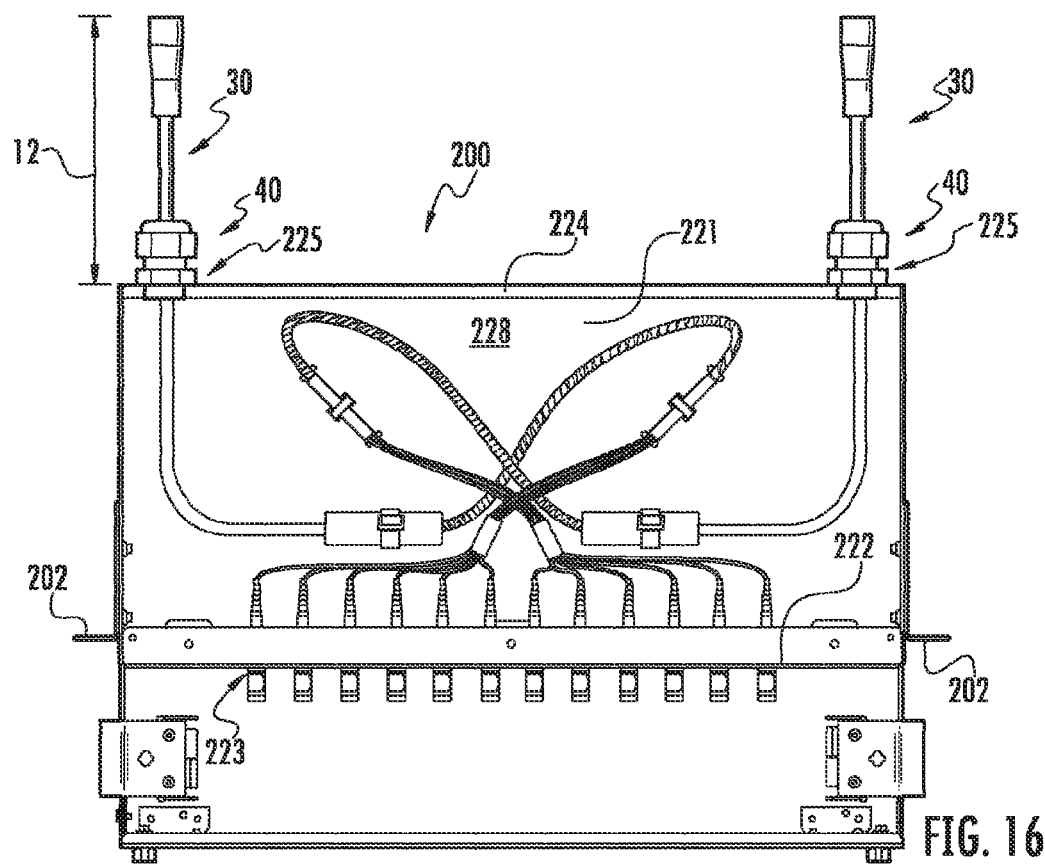

In further embodiments, at least one sub-assembly 30 may be located in one of shelf module assemblies 100, 200 (FIGS. 15 and 16). In exemplary embodiments, shelf module assemblies 100, 200 may include a shelf module housing 120, 220 and at least one partially sealed module sub-assembly 30. A portion of sub-assembly 30 may, in exemplary embodiments, be located partially outside of module housing 120, 220 by a distance 12. Distance 12 may be defined as an exterior distance from module housing 120, 220 to an end of sub-assembly 30. Shelf module assemblies 100, 200 may be configured, for example, having at least one flange 102, 202, for securing to a rack, for example, located in a data center. Module housing 120, 220 may have a bottom 121, 131 and at least two walls, e.g., a first shelf wall 122, 222 and a second shelf wall 124, 224. In exemplary embodiments, first shelf wall 122, 222 and second shelf wall 124, 224 may extend from bottom 121, 221. Module housing 120, 220, in exemplary embodiments, defines at least one shelf adapter aperture 123, 223, for example, positioned on first shelf wall 122, 222 and in further exemplary embodiments defines a plurality of shelf adapter apertures 123, 223. Module housing 120 may define at least one shelf input aperture 125, for example, positioned on second shelf wall 124. Module housing 220 may define at least two shelf input apertures 225, for example, positioned on second shelf wall 224. Adapter aperture 123, 223 and input aperture 125, 225 may provide access to an interior space 128, 228. In exemplary embodiments, walls 122, 222 and 124, 224, respectively, may be substantially aligned to each other, for example, may be substantially parallel. In other exemplary embodiments, walls 122, 222 and 124, 224, respectively, may be substantially at angles relative to each other, for example, not parallel. As depicted, shelf module assemblies 100, 200 may be, for example, 1 U rack mountable assemblies, but larger assemblies, for example, 2 U, 3 U or larger may be contemplated within the scope of this disclosure.

Figure 17:
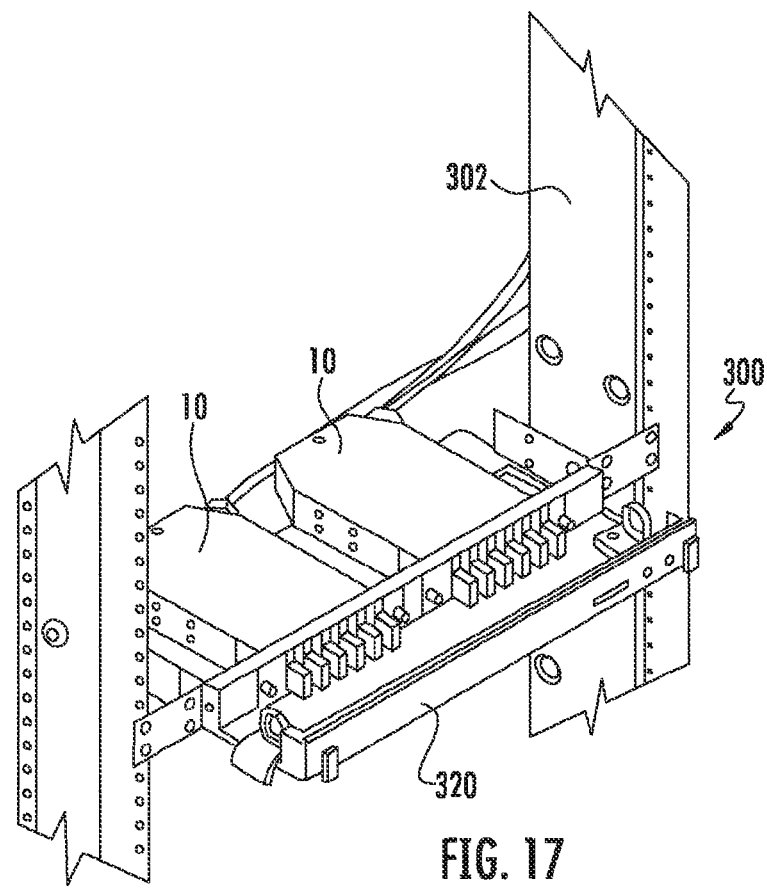
FIGS. 17 and 18 are front and rear perspective views, respectively, of the module of FIG. 1 installed on a rack mounted shelf.
Figure 18:
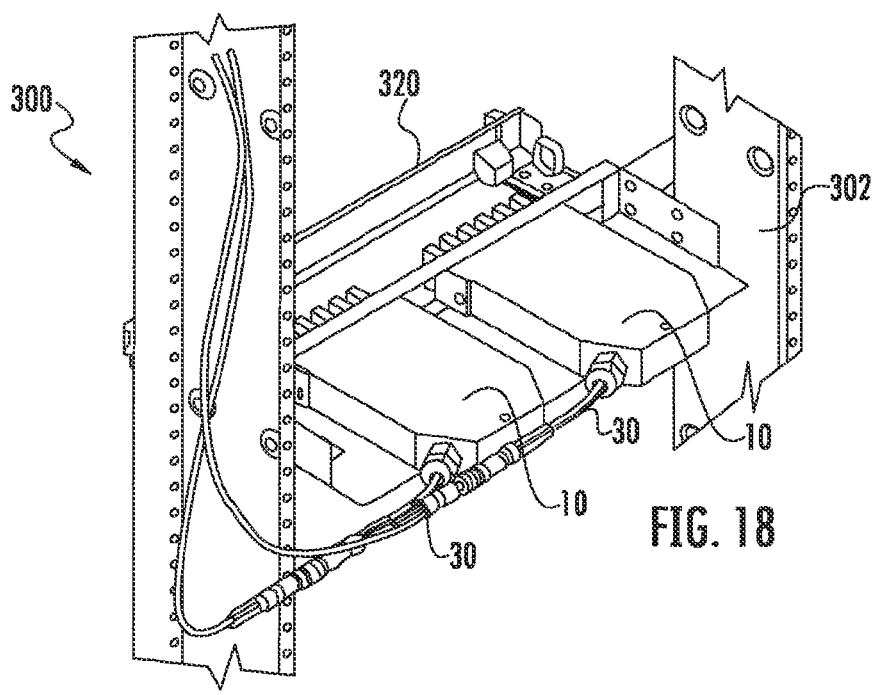

In other embodiments, an alternate shelf module assembly 300 (FIGS. 17 and 18) may include at least one module 10, and in exemplary embodiments, may contain a pair of modules 10. Shelf module assembly 300 may include a rack mountable 1 U shelf 320 for receiving at least one module 10. Rack mountable shelf 320 may be configured to attach to, for example a standard rack 302. In exemplary embodiments, modules 10 may be mounted, for example, horizontally, enabling operator access to each sub-assembly 30, for example, for routing feeder or trunk cables from rack 302 to each sub-assembly 30. It may be appreciated that more than one level of modules 10 may be arranged in yet other alternate shelf module assemblies (not shown) and such embodiments are within the scope of this disclosure.

Figure 19:
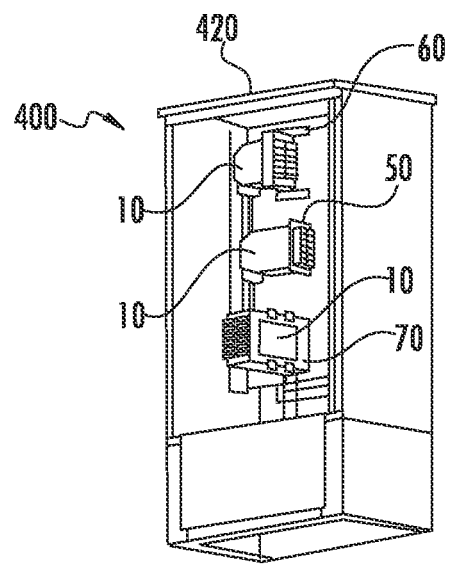
FIG. 19 is a perspective view of a representative base cabinet having the embodiments of FIGS. 5, 7 and 9 installed.
Figure 20:
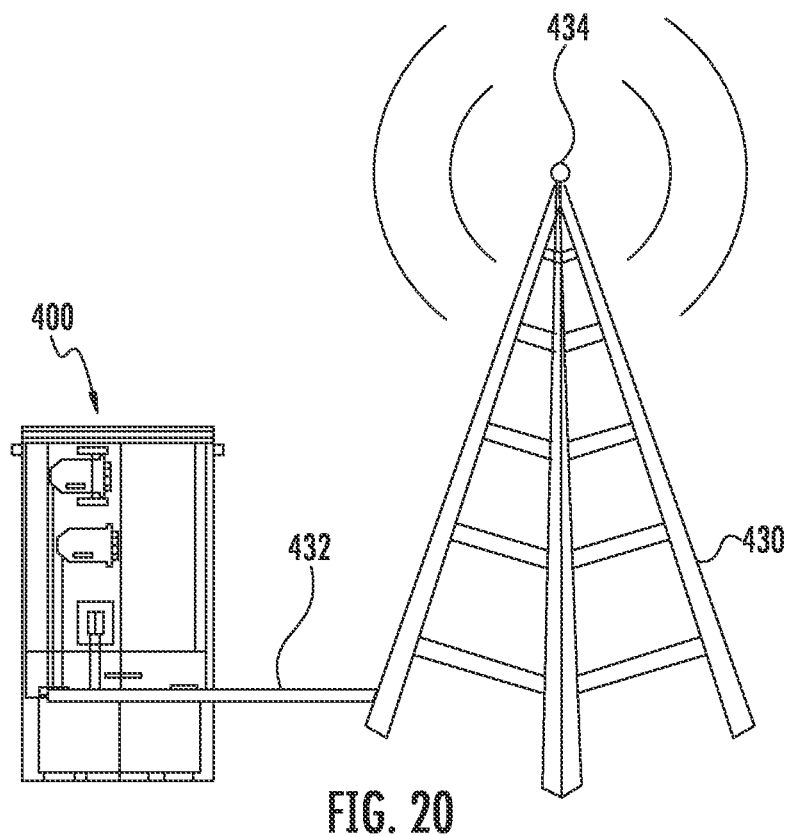
FIG. 20 is a schematic view of a wireless communication system including the base cabinet of FIG. 19.

In exemplary embodiments, one or more modules 10, contained in any one or more of brackets 50, 60 or 70, may be located in a cabinet, for example, a base cabinet assembly 400 (FIG. 19). A base cabinet 420 may be in communication with, for example, a Remote Radio Head 434 mounted, for example, on an antenna 430, or on a similarly tall structure, for example, a building.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:
1. A fiber optic module, comprising:
a module housing defining an interior space, the module housing further defining at least one adapter aperture and at least one input aperture; and
a module sub-assembly, the sub-assembly comprising at least one fiber optic cable passing through the at least one input aperture, at least one multi-fiber connector on an end of the fiber optic cable, and at least one single fiber connector on an opposite end of the fiber optic cable, the multi-fiber connector being in optical communication with the at least one single fiber connector, the at least one multi-fiber connector being disposed outside the interior space and the at least one single fiber connector being disposed within the interior space, the multi-fiber connector capable of flexing on the at least one fiber optic cable relative to the module housing;

a compression fitting associated with the at least one input aperture for securing the module assembly to the module housing, the fiber optic cable passing through the compression fitting and extending out of the interior space for a distance, the distance being adjustable from a first distance to a second distance.

2. The module of claim 1, the multi-fiber connector capable of flexing on the fiber optic cable relative to the module housing up to about 180 degrees.

3. The module of claim 1, the multi-fiber connector capable of transmitting a torsion to the fiber optic cable, twisting at least a portion of the fiber optic cable up to 90 degrees relative to the module housing.

4. The module of claim 1, the multi-fiber connector being a hardened multi-fiber connector.

5. The module of claim 4, the module sub-assembly having a sealed portion, the hardened multi-fiber connector being on one end of the sealed portion and a demarcation on an opposite end of the sealed portion, the demarcation including a sealant.

6. The module of claim 5, the sealed portion including a rugged fiber optic cable.

7. The module of claim 4, the module sub-assembly having an unsealed portion, the unsealed portion having the demarcation on one end of the unsealed portion and the single fiber connector on another end of the unsealed portion.

8. The module of claim 7, the unsealed portion further including a furcation for transitioning from the at least one multi-fiber ribbon to the at least one single fiber.

9. The module of claim 1, the module housing having a bottom and at least two walls extending from the bottom, the at least one connector adapter aperture and the at least one input aperture each being on different walls, the at least two walls being at an angle from zero to 90 degrees relative to each other.

10. The module of claim 1, the module defining a surface mountable module assembly, the module assembly including a side insertion mounting bracket for mounting at least one module to a mounting surface, the module engaging the side insertion mounting bracket substantially in alignment with the mounting surface, the mounting bracket including module mounting apertures on a first leg and mounting surface apertures on a second leg, the first leg and the second leg being orthogonal.

11. The module of claim 1, the module defining a surface mountable module assembly, the module assembly including an angular insertion mounting bracket for mounting at least one module to a mounting surface, the module engaging the angular insertion mounting bracket substantially at an angle to the mounting surface, the angle being less than 90 degrees, the angular mounting bracket including:
  a wall mounting area, the wall mounting area including at least one wall mounting aperture;
  a module mounting area, the module mounting area being at an angle to the wall mounting area and including module mounting apertures; and
  at least one routing guide, the at least one cable routing guide being located in at least one routing guide aperture.

12. The module of claim 1, the module defining a surface mountable module assembly, the module assembly including an orthogonal insertion mounting bracket for mounting at least one module to a mounting surface, the module engaging the orthogonal insertion mounting bracket substantially perpendicular to the mounting surface, the orthogonal mounting bracket including:
  a wall mounting area, the wall mounting area including at least one wall mounting aperture;
  a module mounting area, the module mounting area being substantially perpendicular to the wall mounting area and including module mounting apertures; and
  at least one routing guide, the at least one cable routing guide being located in at least one routing guide aperture.

13. The module of claim 1, the module defining a rack mountable module assembly, the module assembly including a shelf for mounting at least one module to a rack having at least two vertical support columns, the module engaging the shelf such that the at least one multi-fiber connector on an end of the fiber optic cable is pointed generally toward at least one of the vertical support columns.

14. The module of claim 1, the module being positioned in a base cabinet, the base cabinet being in communication with a remote radio head for a wireless communication system.

15. A module sub-assembly, comprising:
  at least one fiber optic cable;
  at least one multi-fiber connector on an end of the fiber optic cable;
  at least one single fiber connector on an opposite end of the fiber optic cable, the multi-fiber connector being in optical communication with the at least one single fiber connector;
  a demarcation;
  a furcation, the demarcation being located along the at least one fiber optic cable between the multi-fiber connector and the furcation, the furcation being located along the at least one fiber optic cable between the demarcation and the at least one single fiber connector; and
  a compression fitting, the compression fitting being about the at least one fiber optic cable between the demarcation and the multi-fiber connector.

16. The sub-assembly of claim 15, the multi-fiber connector being a hardened multi-fiber connector.

17. The sub-assembly of claim 16, the at least one fiber optic cable being a rugged fiber optic cable.

18. The sub-assembly of claim 17, the sub-assembly including a sealed portion, the sealed portion defined by the hardened multi-fiber connector, the demarcation and the rugged fiber optic cable, the demarcation including a sealant.

19. The sub-assembly of claim 15, the sub-assembly including an unsealed portion, the unsealed portion having the demarcation on one end of the unsealed portion and the single fiber connector on another end of the unsealed portion.

20. The sub-assembly of claim 15, the sub-assembly being positioned in a housing, the housing being a module housing, the module housing defining an interior space, the module housing further defining at least one adapter aperture and at least one input aperture, the at least one fiber optic cable passing through the at least one input aperture, the compression fitting being associated with the at least one input aperture, the at least one single fiber connector being associated with the at least one adapter aperture, and the multi-fiber connector capable of flexing on the at least one fiber optic cable relative to the module housing.

21. The sub-assembly of claim 15, the sub-assembly being positioned in a housing, the housing being a rack mountable shelf, the rack mountable shelf including a first wall and a second wall with a floor therebetween, the compression fitting being associated with the first wall, the demarcation and the furcation being associated with the floor, and the at least one single fiber connector being associated with the second wall, the at least one multi-fiber connector being disposed away from the rack mountable shelf opposite the at least one single fiber connector and capable of flexing on the at least one fiber optic cable relative to the rack mountable shelf.

* * * * *